April 18, 1950 E. L. SCOTT 2,504,886
GAUGE
Filed May 21, 1945 2 Sheets-Sheet 1

INVENTOR
Eben L. Scott
BY
Fishburn & Mullendore
ATTORNEYS

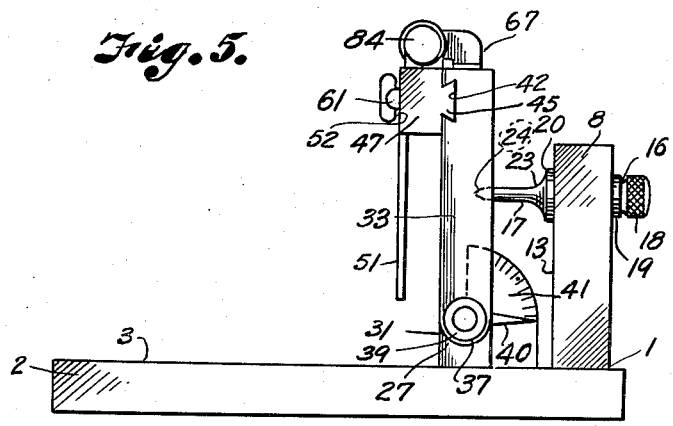
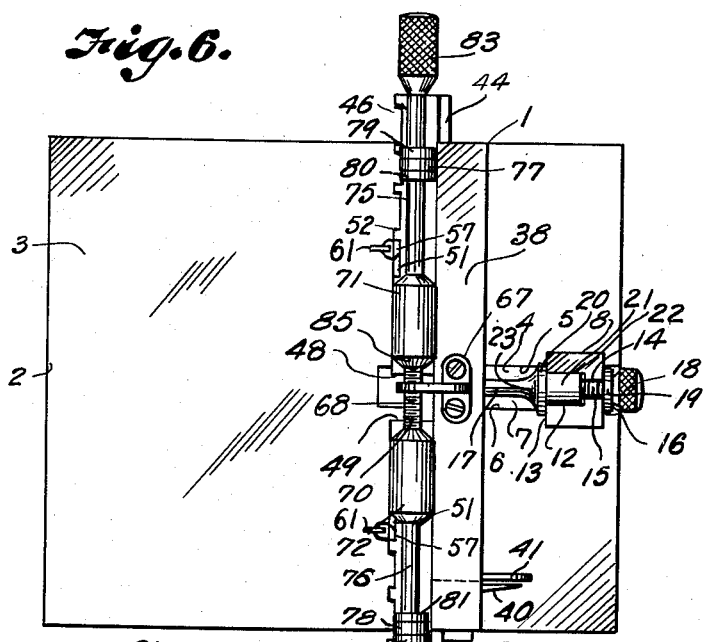
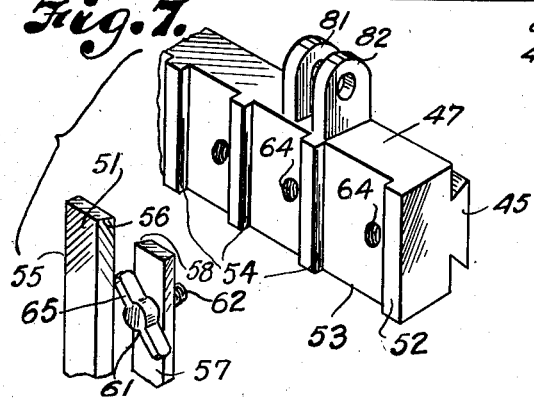

Patented Apr. 18, 1950

2,504,886

UNITED STATES PATENT OFFICE 2,504,886

GAUGE

Eben L. Scott, Mission, Kans.

Application May 21, 1945, Serial No. 594,959

6 Claims. (Cl. 33—174)

This invention relates to gauges, particularly for laying out or measuring locations of points or lines relative to center locations and has for its principal object to provide a gauge of this character which is readily manipulated for obtaining accurate layout and/or inspection of a workpiece, for example, a die, tool holding blocks, and like workpieces where extreme accuracy is essential.

Other objects of the invention are to provide a work layout or measuring gauge of simple construction; to provide a gauge for locating points or lines relative to the center of a borehole in a workpiece; to provide a layout gauge with a micrometer adjustment for the measuring means; to provide a gauge adjustable for layouts on planes at an angle relative to the axis of a borehole from which measurements are to be made; and provide a gauge with straight edges for indicating points and guiding scribe lines on a workpiece, which straight edges are loosely positioned to the nearest unit of measure and then finally adjusted by means of a micrometer scale.

In accomplishing these and other objects of the invention hereinafter pointed out I have provided improved structure, the preferred form of which is illustrated in the accompanying drawing wherein:

Fig. 5 is a side elevational view of the gauge.

Fig. 6 is a plan view of the gauge.

Fig. 7 is a fragmentary perspective view of one of the straight edge blade supporting bars with the upper portion of the blades and its retaining clamp in disassembled spaced relation.

Fig. 8 in an enlarged cross section through the supporting bar, straight edge blade, and clamping member showing the parts in assembly.

Referring more in detail to the drawings:

1 designates a center gauge including a base 2 having a plane top surface 3 upon which a workpiece is supported while measurement layouts are made thereon relative to a center or starting point. The base 2 may be of any suitable shape but is shown as rectangular in form and of a size to accommodate a workpiece and maintain stability thereof.

Figure 1:
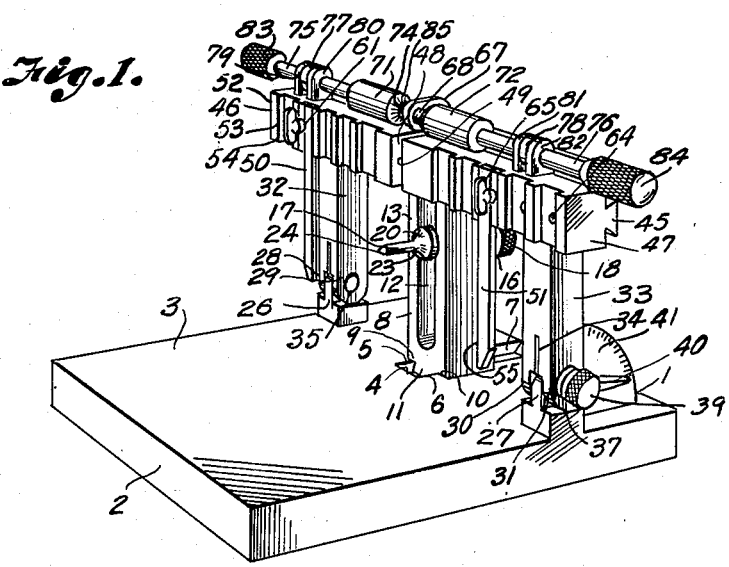
Fig. 1 is a perspective view of a layout and measuring gauge constructed in accordance with the present invention.
Figure 2:
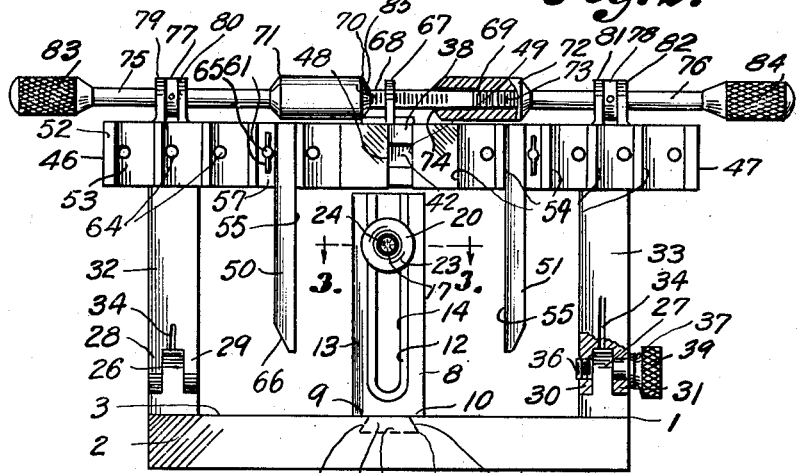
Fig. 2 is a front view of the gauge with parts broken away to better illustrate the construction thereof.
Figures 3, 4:
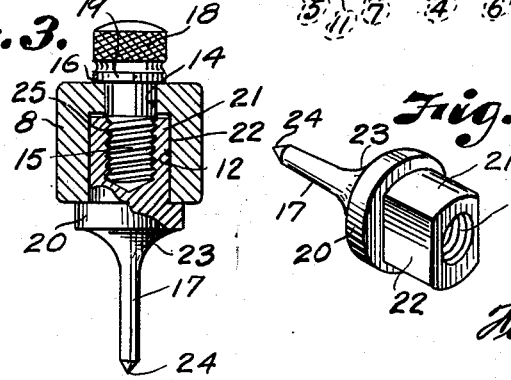
Fig. 3 is an enlarged section through the centering pin and its adjustable support on the line 3—3 of Fig. 2.
Fig. 4 is a perspective view of the centering pin.

Formed in the base and extending inwardly from a side thereof is a recess 4 having undercut sides 5 and 6 for forming a way 7 to adjustably mount a centering pin supporting post 8. The lower end of the post which is located in the groove has shoulder edges 9 and 10 forming a head 11 therebetween which is closely engaged in the way 7 to carry the centering pin to and from contact with the workpiece, as later described. The post 8 has a vertically arranged slot-like recess 12 in the forward face 13 thereof and which extends from near the lower end of the post through the upper end thereof as shown in Figs. 2 and 6. The back of the recess has a through slot 14 substantially coextensive therewith to pass the threaded shank 15 of a clamping screw 16 to anchor a centering pin 17 in an adjusted position vertically of the post. The clamping screw preferably has a knurled head 18 carrying an annular flange 19 for engaging the rear face of the post to draw the centering pin into fixed position therein. The centering pin 17 is best shown in Fig. 4 and includes a substantially disk-like flange 20 having a shank 21 projecting therefrom and provided with flat sides 22 spaced to conform with the width of the recess 12. The centering pin also is rounded outwardly from the front of the disk portion 20 as indicated at 23 and terminates in a point 24. If desired, gauge pins of different diameter and length may be provided to suit the type of work with which the gauge is to be used. The rear end of the shank 20 has an internally threaded bore 25 in which the shank of the clamping screw is turned when it is desired to retain the centering pin in a vertically adjusted position on the post for projecting the pin into a bore opening of the workpiece or aligning the point thereof with a starting point on the workpiece from which other points or lines are to be spaced. Located on the respective sides of the base of the gauge and extending upwardly therefrom are ears 26 and 27 engaging between spaced ears 28—29 and 30—31 of bar supports 32 and 33. The supports 32 and 33 have slots 34 formed intermediate the ears thereof so that when a pivot pin 35 and the shank 36 of an adjusting screw 37 are inserted in transverse openings of the ears, the ears of the supports are frictionally engaged with the ears of the base. The supports are thus hinged for arcuate movement relative to the face 3 of the base about the axis of the pivotal connections to carry a transverse bar 38 toward and away from the face 3 of the base. The shank of the clamping screw preferably extends loosely through the ear 31 on the support 33 and through a registering opening of the ear 27 on the base into a threaded registering opening in the ear 30 as shown in Fig. 2 so that when the flanged portion of a knurled head 39 of the adjusting screw is turned the ears are clamped together to retain a fixed relationship between the supports and the base of the gauge. The pin 35 may have the ends thereof riveted to exert sufficient friction between the ears to cooperate with the clamping screw in maintaining rigid alignment of the cross bar 38 after an adjustment.

In order to indicate the angular adjustment of the bar 38, the support 33 preferably carries a pointer 40 projecting laterally of the axis of the pivotal connection and which operates over a protractor scale 41 that is fixed to the base in cooperative relation of the pointer. The supports 32 and 33 are of a height to carry the cross bar 38 above the upper terminal end of the post 8 so that the bar may swing thereover. The front face of the cross bar 38 has a dovetail or similar shaped groove 42 extending longitudinally thereof and forming a guide track for slidably mounting dovetail ribs 44 and 45 on the backs of blade carrying bars 46 and 47. The bars 46 and 47 are moved laterally along the cross bar from a position where the inner ends 48 and 49 thereof abut in a plane in direct alignment with the axis of the centering pin 17 outwardly to carry the straight edges or blades 50 and 51 into registry with the point to be measured laterally of the center gauge. The front faces 52 of the slidable bars are each provided with a series of transverse recesses 53 with the corresponding side edges 54 thereof spaced apart in accordance with a unit of measure; for example, inches, whereby straight edges 55 of the blades are retained in abutting contact with the side edges 54 of any one of the recesses 53 in which the blade is desired to be inserted. The opposite edges of the blades are slightly beveled as indicated at 56 in Fig. 8 to be overlapped by a clamping member 57 having a similar inclined beveled edge 58 to urge the straight edge of the blade in firm contact with the recess in which it is to be mounted. The clamping member is retained in position by a clamping screw 61 having a threaded shank 62 projecting through an opening 63 in the clamping member and into a threaded socket 64 formed in the bottom of each recess. The opposite ends of the screws have winged heads 65 adapted to be drawn against the clamping members.

The lower ends of the blades are suitably shaped as indicated at 66 (Fig. 2) and are movable to and from the face 3 of the base upon loosening of the clamping screw 61 and sliding the blades 50 and 51 in the recesses after which they may be re-tightened so that they are retained in adjusted position.

In order to move the straight edges to fractions less than the unit measures into which the carrying bars are divided, the cross bar carries a bracket 67 which projects above and over the adjacent ends of the slide bars to mount a rod 68, the rod being securely anchored in the bracket so that it is fixed against any movement. The ends of the bar 68 project laterally parallel with the slide bars and the terminals thereof have threads 69 (Fig. 2) conforming in pitch to fractions of the unit measure as indicated by the graduations 70 on the rod as best shown in Fig. 2. Sleeved over the graduated portions of the rod are micrometer barrels 71 and 72 having coaxially threaded sockets 73 (Fig. 2) engaged with the threaded terminals 69 of the rod so that when the barrels are rotated the inner terminal ends 74 are moved along the graduations. The micrometer barrels have axial stems 75 and 76 projecting outwardly from the outer ends thereof and which stems carry collars 77 and 78 fixed thereto and engage between pairs of ears 79—80 and 81—82 projecting from the slide bars. The outer ends of the stems have knurled knobs 83 and 84 so that the stems may be readily rotated to turn the barrels on the fixed graduated rod. It is thus obvious that the slide bars may be moved outwardly relative to the centering pin 17 to fractions of the units of measure to which the blades may be set. The micrometer barrels have graduations 85 on the forward ends thereof corresponding to fractions intermediate the fractions designated by the graduations 70.

In using the device constructed and assembled as described, the workplace is located on the face 3 of the base 2 in alignment with the centering pin 17. The post carrying the centering pin is moved on the base to bring the point 24 of the pin into registry with the starting point or center line that has been scribed on the workpiece.

In case of a center opening in the workpiece, a centering pin of corresponding size is applied to the supporting post 13 and the pin caused to enter the opening of the workpiece to retain position of the workpiece relative to the center plane passing through the axis of the pin and abutting ends of the slide bars when the micrometer barrels are in zero position.

Assuming that the unit of measure is in inches and that a point is to be made on the workpiece, a certain number of inches and fractions of inches at one side of the center plane and other point at the opposite side, the straight edges are moved to the nearest inch position on the respective slide bars and secured with the edges 55 thereof in engagement with the side edges 54 of the recesses 53 by means of the clamping plates 57, the shank 62 of the clamping screws 61 having been turned into the threaded recesses 64 of the selected recesses 53. The micrometer barrels are then adjusted to obtain the desired fraction of inches whereupon the straight edges 55 are in exact registry with the points to be located on the workpiece. In making this adjustment the knurled knobs 83 and 84 of the micrometer shafts 75 and 76 are turned until the desired graduations 85 and 70 are noted exactly in the same manner as a standard micrometer. Rotation of the barrels causes the barrels to move outwardly by reason of their threaded connection with the rod 68 and since the collars 77 and 78 are anchored between the pairs of ears 79—80 and 81—82, the slide bars 46 and 47 are moved outwardly on the track of the cross bar 38.

When the device is to be used in locating or measuring points on inclined planes, the cross bar 38 and the supporting arms 32 and 33 thereof are hinged on the ears 26 and 27 by loosening the clamping screw 36 and swinging the assembly to the desired degree as indicated by the position of the pointer 40 relative to the protractor scale 41. The clamping screw is then tightened to retain the assembly in the desired angular relationship.

It is obvious that the straight edge blades may be moved vertically within their recesses so as to locate the ends thereof relative to the face 3 of the base. It is also obvious that the straight edges may be used as guides for applying scribe lines to a workpiece in the layout thereof.

From the foregoing it is obvious that I have provided a gauge for facilitating accurate layout or measure of locations, point, or lines relative to a starting point on a workpiece.

What I claim and desire to secure by Letters Patent is:

1. A gauge of the character described including a workpiece support, a centering pin, means mounting the centering pin on the support for lateral and vertical movement with respect to the support, a transverse bar having a guide track, arms supporting the bar above the support, slides mounted on the guide track, blades adapted to be adjustably positioned on said slides, means for detachably retaining the blades on said slides, and micrometer means for positioning said slides on the guide track in predetermined positions laterally of said centering pin.

2. A gauge of the character described including a workpiece support, a centering pin, means mounting the centering pin on the support for lateral and vertical movement with respect to the support, a transverse bar having a guide track extending longitudinally of said bar, arms supporting the bar above the support, slides mounted on the guide track and having seats spaced laterally along the length of the slides in accordance with a standard unit of measure, blades adapted to be positioned in said seats, clamping means for detachably retaining the blades in said seats, and micrometer means for positioning said slides on the track in predetermined positions laterally of said centering pin.

3. A gauge of the character described including a workpiece support, workpiece locating means on the support, a transverse bar having a guide track thereon extending longitudinally of said bar, arms supporting the bar above the support, slides mounted on the guide track and having seats spaced laterally along the length of the slides in accordance with a standard unit of measure, blades adapted to be positioned in said seats, clamping means for detachably retaining the blades in seats, a threaded rod on the support having fractional graduations of said unit of measure, micrometer barrels having threaded connection with said rod, shafts carrying said barrels, means rotatably fixing the shafts to said slides, and means for rotating the shafts.

4. A gauge of the character described including a workpiece support, a centering pin, means mounting the centering pin on the support for lateral and vertical movement with respect to the support, a transverse bar having a guide track thereon extending longitudinally of said bar, arms supporting the bar above the support, slides mounted on the guide track and having seats spaced laterally along the length of the slides in accordance with a standard unit of measure, blades adapted to be positioned in said seats, clamping means for detachably retaining the blades in said seats, a threaded rod in the support having fractional graduations of said unit of measure, micrometer barrels having threaded connections with said rod, shafts carrying said barrels, means rotatably fixing the shafts to said slides, and means for rotating the shafts.

5. A gauge of the character described including a workpiece support, workpiece locating means on the support, a transverse bar having a guide track thereon extending longitudinally of said bar, arms pivotally supporting the bar above the support, slides mounted on the guide track and having seats spaced laterally along the length of the slides in accordance with a standard unit of measure, blades adapted to be positioned in said seats, clamping means for detachably retaining the blades in said seats, a threaded rod on the support having fractional graduations of said unit of measure, micrometer barrels having threaded connection with said rod, shafts carrying said barrels, means rotatably fixing the shafts to said slides, means for rotating the shafts, and means for retaining said arms in selected pivoted positions on the support.

6. A gauge of the character described including a workpiece support, workpiece locating means on the support, a transverse bar having a guide track thereon extending longitudinally of said bar, arms pivotally supporting the bar above the support, slides mounted on the guide track and having seats spaced laterally along the length of the slides in accordance with a standard unit of measure, blades adapted to be positioned in said seats, clamping means for detachably retaining the blades in said seats, a threaded rod on the support having fractional graduations of said unit of measure, micrometer barrels having threaded connection with said rod, shafts carrying said barrels, means rotatably fixing the shafts to said slides, means for rotating the shafts, means for retaining said arms in selected pivoted positions on the support, a protractor on the workpiece support, and a pointer on one of the arms for cooperating with the protractor for indicating angular positions of the blades relatively to the workpiece support.

EBEN L. SCOTT.

REFERENCES CITED

The following references are of record in the file of this patent:

UNITED STATES PATENTS

| Number | Name | Date |
| --- | --- | --- |
| 2,057,516 | Favre | Oct. 16, 1936 |
| 2,205,979 | Horechney | June 25, 1940 |

FOREIGN PATENTS

| Number | Country | Date |
| --- | --- | --- |
| 194,508 | Great Britain | Mar. 15, 1923 |
| 457,372 | Germany | Mar. 14, 1928 |